April 13, 1965 — E. W. ANTHON — 3,178,266
MATERIALS HANDLING APPARATUS
Filed Oct. 7, 1960 — 4 Sheets-Sheet 1
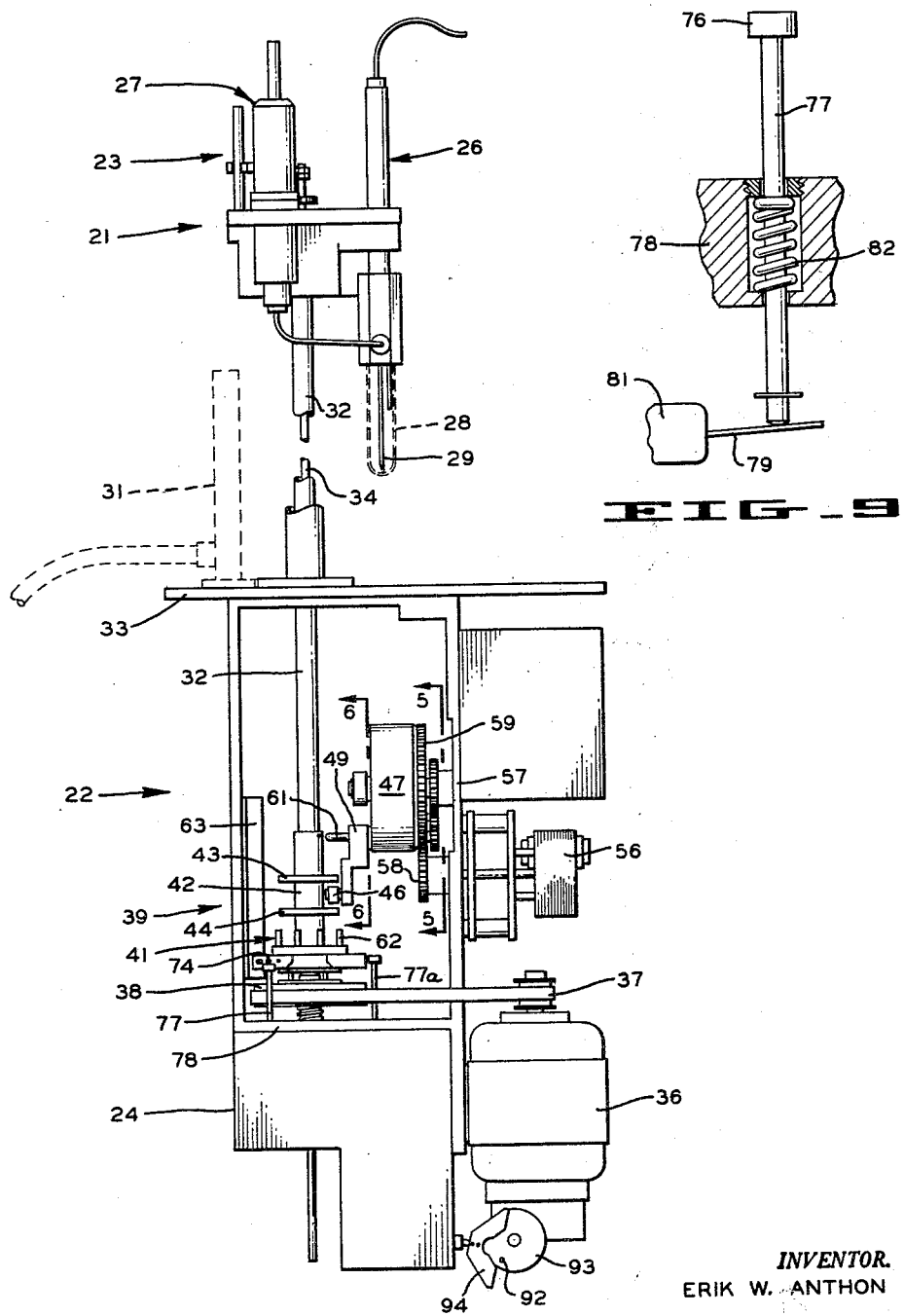
FIG_9
FIG_1
INVENTOR.
ERIK W. ANTHON
BY
Schapp & Hatch
ATTORNEYS April 13, 1965 E. W. ANTHON 3,178,266
MATERIALS HANDLING APPARATUS
Filed Oct. 7, 1960 4 Sheets-Sheet 2
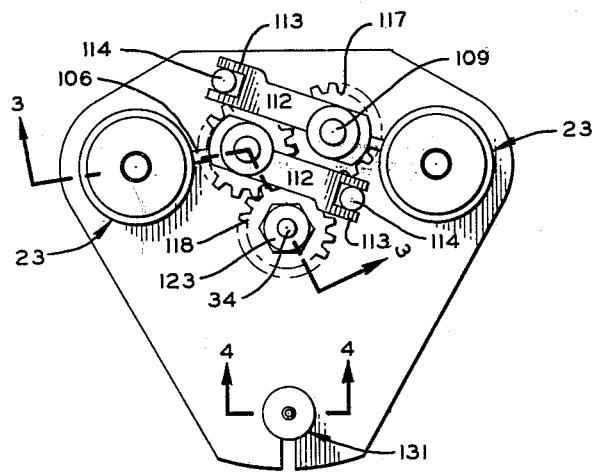
FIG_2_
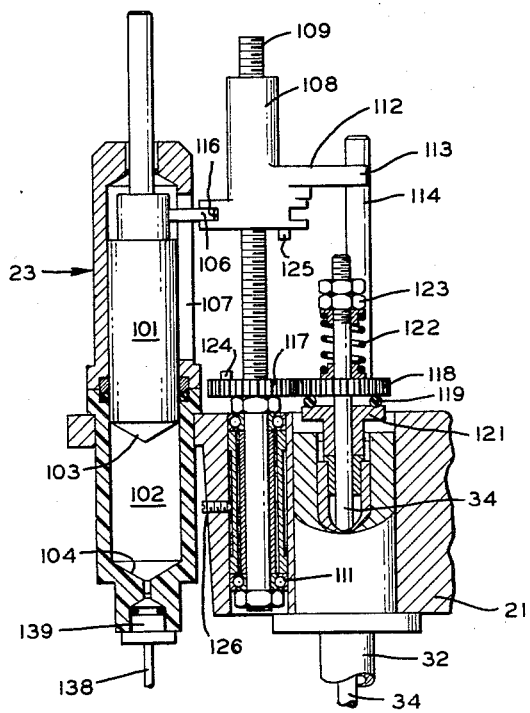
FIG_3_
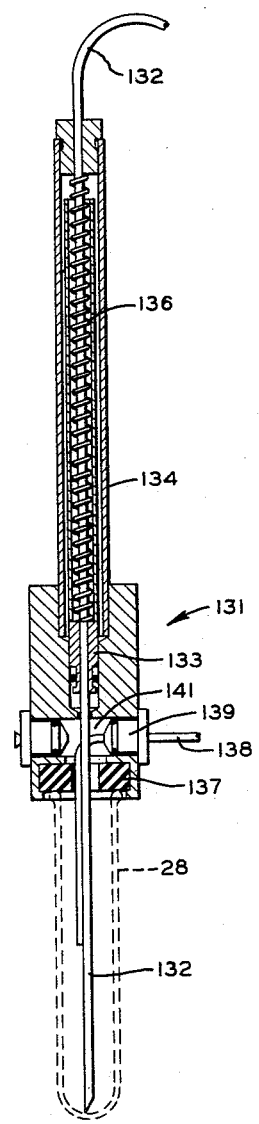
FIG_4_
INVENTOR.
ERIK W. ANTHON
BY Schapp & Hatch
ATTORNEYS

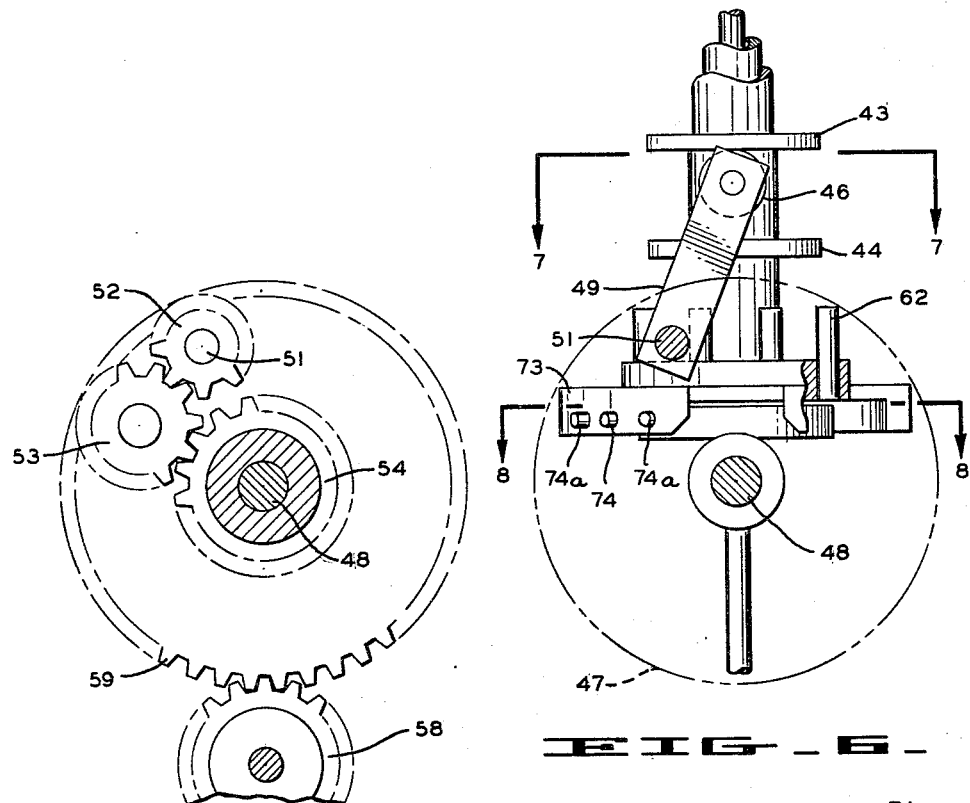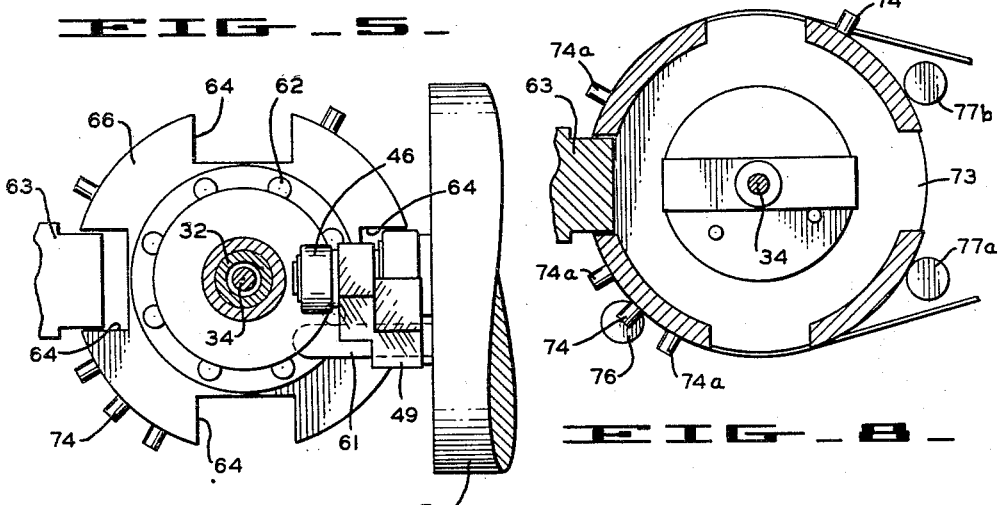

April 13, 1965 E. W. ANTHON 3,178,266
MATERIALS HANDLING APPARATUS
Filed Oct. 7, 1960 4 Sheets-Sheet 4
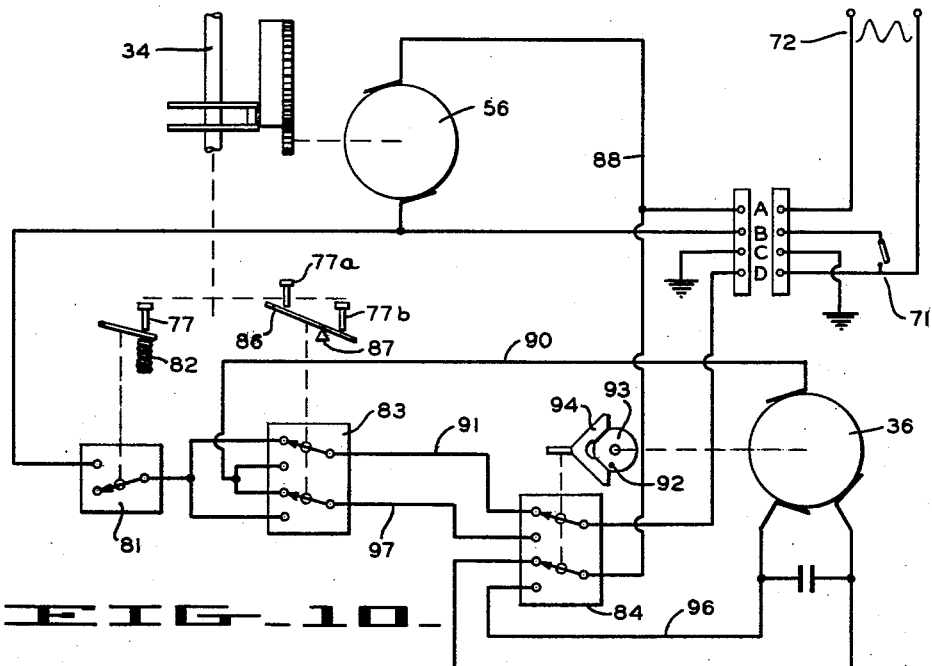
FIG_10_
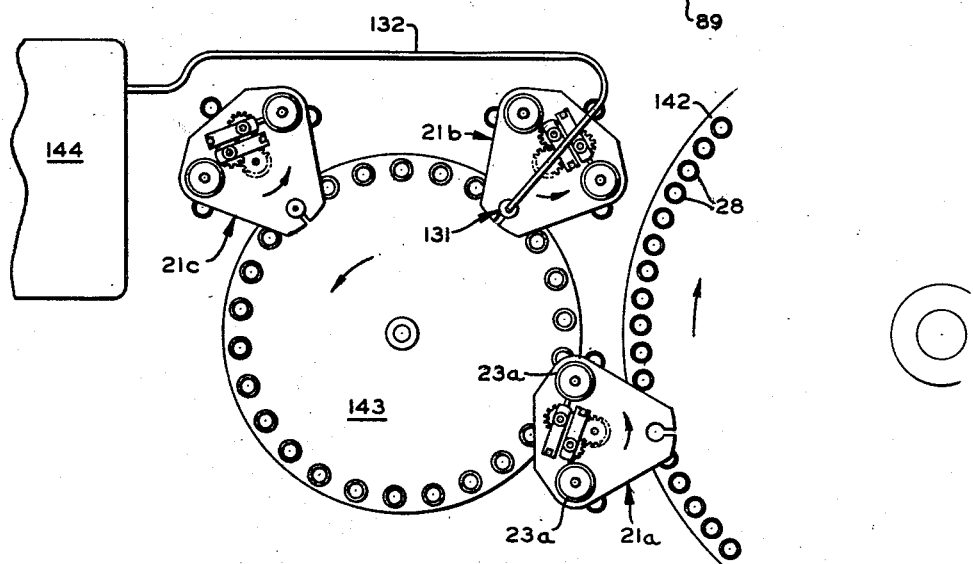
FIG_11_
INVENTOR.
ERIK W. ANTHON
BY
Schapp & Hatch
ATTORNEYS

United States Patent Office 3,178,266
Patented Apr. 13, 1965

3,178,266
MATERIALS HANDLING APPARATUS
Erik W. Anthon, Kensington, Calif., assignor, by mesne assignments, to Warner-Lambert Pharmaceutical Company, Morris Plains, N.J.
Filed Oct. 7, 1960, Ser. No. 61,206
15 Claims. (Cl. 23—253)

This invention relates to improvements in a materials handling apparatus, and more particularly to equipment for handling and treating fluid samples in carrying out chemical analyses of the samples.

Many types of chemical analyses require the processing of a great number of samples of similar character. The manipulatory functions to be carried out in performing the analyses may be relatively simple or quite complex. In either case, the performing of similar operations on a multitude of samples is boring to the operator and the likelihood of variations caused by such boredom is high.

The repetitive performance of similar operations lends itself to automation. The use of automatic analyzing apparatus can result in material savings in the time of the operator, and has the further advantage of increasing the accuracy of the analysis by reducing the chance of error.

The apparatus of the present invention is particularly suited for use in such an automated system. The apparatus has found applications in a wide variety of processes, where the final measuring instrument may be, for example, a spectrophotometer, a radiation counter, or pH meter.

To increase the flexibility of use, the apparatus may be programmed to perform various analytical functions. For example, it may be employed to add measured quantities of desired reagents to the sample, to maintain the sample in a controlled environment for a desired period of time, to transfer the treated sample to a final measuring instrument, or instruments, and to retain the sample for further treatment; the particular sample being at all times readily identifiable and maintained in a desired sequential relationship.

Thus, the present apparatus may be used in a modular system with various other automatic modules which can be combined in different ways with themselves and with many compatible items from other sources. Each module performs a specific action or group of related actions. When the particular analysis desired is completed and it becomes expedient to switch the apparatus over to a different type of analysis, the apparatus may be used in combination with other modules by programming the apparatus to function in different patterns of operation.

Some of the principal problems solved by the present apparatus are those of consistently and accurately adding and handling measured quantities of samples and reagents. In order to provide extreme accuracy, it is necessary that the materials handling apparatus be self-cleaning, that is, it should wash itself out and dry itself after the handling of one sample is completed and before attempting to handle the next sample.

Flexibility as to the types or patterns of operations carried out is desirable as is flexibility in the timing or duration of the different operations. The apparatus should also be compatible with other components or modules of the system.

It is, accordingly, an object of the present invention to provide a materials handling apparatus adapted to function as a component, or module, of a modularized automatic analysis system, the materials handling apparatus being adapted to treat, process and convey the samples to other modules for final measurement.

Another object of the present invention is to provide a materials handling apparatus of the character described which will maintain the sample in the same sequential relationship with respect to the other samples during the entire handling period so as to make each individual sample readily identifiable at all times.

A further object of the present invention is to provide a materials handling apparatus of the character described which will retain a minimum amount of sample after the sample has been treated and which will automatically wash out all passages and chambers and will dry out such passages and chambers prior to receiving the next sample.

Still another object of the present invention is to provide a materials handling apparatus of the character described which may be programmed to perform a variety of functions, the apparatus being flexible as to the sequence in which the functions are performed and the timing or duration of each operation.

Yet another object of the invention is to provide a drive means for a material handling apparatus of the character described which will lift, rotate and lower a transfer head to precisely indexed positions or stations in a desired sequence, and which will automatically repeat the cycle so long as is required to process the entire batch of samples.

Further objects and advantages of my invention will appear as the specification continues, and the new and useful features of my materials handling apparatus will be fully defined in the claims attached hereto.

The preferred forms of my invention are illustrated in the accompanying drawings, forming part of this application, in which:

FIGURE 1 is a side elevational view of a fluid materials handling apparatus constructed in accordance with the present invention;

FIGURE 2 is an enlarged plan view of a transfer head forming a part of the apparatus of FIGURE 1;

FIGURE 3, a fragmentary cross-sectional view taken substantially on the plane of line 3—3 of FIGURE 2;

FIGURE 4, a cross-sectional view of a siphon device taken substantially on the plane of line 4—4 of FIGURE 2;

FIGURE 5, an enlarged fragmentary cross-sectional view taken substantially on the plane of line 5—5 of FIGURE 1;

FIGURE 6, an enlarged fragmentary cross-sectional view taken substantially on the line of 6—6 of FIGURE 1;

FIGURE 7, a plan sectional view taken substantially on the line of 7—7 of FIGURE 6;

FIGURE 8, a plan sectional view taken substantially on the plane of line 8—8 of FIGURE 6;

FIGURE 9, a vertical cross-sectional view of a switch actuator forming part of the present invention;

FIGURE 10, a schematic view showing the electrical circuit and illustrating operative relationship of various parts of the apparatus of FIGURE 1; and FIGURE 11, a diagrammatic plan view of the apparatus of FIGURE 1 set up as modules in an automatic chemical analysis apparatus.

While I have shown only the preferred forms of my invention, it should be understood that various changes or modifications may be made within the scope of the claims hereto attached, without departing from the spirit of the invention.

Referring to the drawings in detail, it will be seen that the materials handling apparatus of the present invention consists basically of a transfer head 21, drive means 22 for selectively moving the transfer head between a plurality of stations, pump means 23 on the transfer head formed for taking in and ejecting a measured quantity of fluid, and control means 24 responsive to the operation of the drive means 22 for selectively actuating the intake and ejecting cycles of pump means 23 when the transfer head 21 is positioned at pre-selected stations.

The term "pump means" is used herein to designate the various mechanisms mounted on the transfer head 21 and which perform a variety of material handling functions. One possible set-up is illustrated in FIGURES 1 through 9 of the drawings, wherein the pump means 23 includes a siphon unit 26 and a pump unit 27 cooperative therewith for drawing a sample out of a sample tube 28 and conveying it to a final measuring instrument, the latter comprising another module of the modular system in which the apparatus of the present invention may be integrated.

Other material handling units may be mounted on the basic transfer head 21 in the manner illustrated in FIGURE 11 of the drawings, but the transfer head remains the same and operates in the same manner as the transfer head illustrated in FIGURES 1 through 9.

In accordance with the present invention, the transfer head 21 is mounted for reciprocation along and rotation around a vertical axis so as to be movable between a plurality of stations. The pump means 23, mounted on the transfer head 21, has one or more conduits provided with a depending end 29 adapted for extending into different open-top containers when the transfer head is at the different stations.

The conduit end 29, hereinafter designated as probe 29, is positioned relative to the transfer head 21 so that downward movement of the head when at one of the designated stations will insert the probe downwardly into the sample tube 28, or in the other open-top container such as reagent or water reservoirs 31. Of course, it will be understood that the probe will function equally well with any type of open-top container located in the correct position and the particular container used will depend upon the function to be performed thereat.

As here shown, the transfer head 21 is mounted upon a hollow shaft 32 which is mounted for vertical and rotational movement relative to a table member 33. Since the transfer head 21 is carried on the upper end of hollow shaft 32 for movement therewith, rotation and vertical reciprocation of the shaft will move the transfer head accordingly.

Journaled for rotation within hollow shaft 32 is a drive shaft 34 adapted to operate the pump means 23 mounted on the transfer head 21. Rotation of shaft 34 is effected by a drive motor 36 connected by belt 37 to a pulley 38 secured to the shaft 34.

The aforesaid vertical reciprocation of shaft 32 is provided by an elevator means 39, and rotation of shaft 32 is provided by an indexing drive means 41. The elevator means 39 here includes a collar 42 having spaced flanges 43 and 44 extending horizontally therefrom, the collar being carried on and secured to the hollow shaft 32. A roller 46 is mounted for vertically reciprocating movement between the flanges 43 and 44 so as to move the shaft 32 and transfer head 21 up and down with the vertical movement of the roller.

A drive element 47 of cylindrical form is carried on a shaft 48 for rotation around a horizontal axis which intersects the axis of shaft 32. An arm 49 is pivoted at one end on a pin 51 which is secured to the drive element 47 in parallel spaced relation to the shaft 48. Thus, as the drive element 47 rotates, pin 51 will describe a circle.

The roller 46 is journaled on the distal end of arm 49 for actuation thereby. As may best be seen in FIGURE 5 of the drawings, gearing is provided which causes the roller 46 to travel vertically up and down on a straight path as element 47 rotates so as to keep the roller 46 always between the flanges 43 and 44.

This gearing consists of a pinion gear 52 secured to shaft 51 and enmeshed with an idler gear 53 which is in turn enmeshed with a gear 54 secured to drive element shaft 48. The gear ratios of the gears 52–53 are such as to rotate the arm 49 relative to the drive element 47 as the latter rotates on shaft 48 in such manner that the roller 46 will describe the aforesaid straight vertical path.

Rotation of drive element 47 is effected by a motor 56 mounted upon a frame 57 secured to table 33. The motor 56 drives a gear 58 which is enmeshed with a gear 59 secured to the drive element 47. In this manner, rotative movement of the motor 56 is transmitted into vertical reciprocation of the roller 46, so as to move the shaft 32 and transfer head 21 vertically in accordance with rotation of the motor.

The indexing drive means 41 here includes a pin 61 extending horizontally from drive element 47 in spaced relation to the shaft 48, the pin 61 being engageable with upstanding pins 62, secured in equally spaced relation, around shaft 32, when the shaft is in its uppermost positions so as to provide intermittent rotation of shaft 32 and transfer head 21. Conveniently, and as here shown, pin 61 may comprise an extension of pin 51.

Extending down the side of frame 57 is a guide member 63 which is adapted to engage in slots 64 formed in the rim of a disc-shaped member 66 secured to shaft 32. The guide member 63 extends vertically to a position just below the bottom of member 66 when the latter is in its uppermost position. Thus, guide member 63 will hold shaft 32 and transfer head 21 against rotation at all vertical positions except the uppermost position.

The top of guide member 63 terminates far enough below the maximum upward position of member 66 to allow the pin 61 to engage pins 62 and rotate the shaft 32 by the desired distance. In this connection, it should be noted that the apparatus depicted herein is adapted to rotate the transfer head to four different positions spaced in 90° increments. However, it should be apparent that more or fewer positions may be employed and the spacing between positions may be varied, if desired.

FIGURE 10 schematically illustrates a typical control system for the apparatus of the present invention. As shown herein, a switch 71 is adapted to initiate the cycle. This switch may be manually operated or, preferably, may be operated by movement of the sample tubes 28 into position for treatment of the sample.

In either event, switch 71 connects lead B to a suitable source of alternating current 72, completing the circuit through the elevator drive motor 56 and lead A connected to its other side. The device will have completed its last cycle with the shaft 34, and a disc-shaped member 73 connected thereto (see FIGURE 6), in the lowermost position. A pin 74 extending radially from member 73 will have engaged and pressed down on the head 76 of a vertically reciprocable spring loaded rod 77 mounted through a frame member 78.

The construction of the rod 77 may best be seen in FIGURE 9 wherein it will be noted that the lower end of the rod bears against a feeler 79 adapted to actuate a switch 81. Rod 77 and switch 81 are illustrated schematically in FIGURE 10 of the drawings. When rod 77 is pressed down by pin 74, the switch 81 is in its open position. A spring 82 serves to push up on rod 77 and close switch 81 when the pin 74 moves upwardly.

Switch 81 being open at the beginning of the cycle, the motor 56 will not be energized until switch 71 is closed. As soon as this takes place, the motor 56 begins to lift pin 74 allowing switch 81 to close. Electrical energy can then pass through switch 81 and through switches 83 and 84 to lead D to keep the motor running.

Switch 83 controls the energizing of the pump motor 36 in the following manner: As the drive means 22 completes its initial cycle of lifting the head 21, rotating it 90° and lowering it, the switches 81 and 83 transfer the power from motor 56 to motor 36. The descending member 73 has one or more radially extending pins 74a similar to pin 74 but located on member 73 in position to engage and depress one or the other of a spaced pair of rods 77a and 77b similar to rod 77.

As depicted schematically in FIGURE 10, rods 77a and 77b bear on opposite ends of a bar 86 fulcrumed at 87 so that pressure on rod 77b will move switch 83 to the position illustrated, and pressure on rod 77a will move the switch to its other terminal position. Thus, if pin 74a depresses rod 77a at the end of the first cycle, the switch 83 will be reversed. This will energize the motor 36 by connecting lead A to lead D through leads 88, switch 84, leads 89, 90 and 91.

The motor 36 will rotate until a pin 92, mounted on a disc 93 driven by the motor, throws a toggle 94 connected to switch 84. This will reverse the direction of rotation of the motor 36 by connecting the motor to lead A through lead 96 rather than to lead 89; but breaks the connection to lead D, halting motor 36. At the same time the motor 56 will be energized by connecting lead A to lead D through lead 97. The device will then go through another transfer cycle, and when it again reaches its lowermost position, switch 83 may be reversed to shut off motor 56 and cause motor 36 to rotate in a direction opposite to that at the end of the first transfer cycle.

The operation of the pump motor 36 to either cause the pump means to suck up liquid, expel liquid already sucked up, or to remain dormant, is thus controlled by the placement of the pins 77a and 77b in member 73. Accordingly, flexibility of operation of the apparatus may be easily and simply attained through changing the cyclic relationships merely by relocating pins 77a and 77b.

The pump means 23 is actuated by rotation of the shaft 34 and, while the types of pumps vary somewhat depending upon the use intended, the pumps are basically similar in that they each include a piston 101 moving vertically in a cylinder 102. A typical pump assembly is illustrated in FIGURE 3 of the drawings together with the means for reciprocating the piston in the cylinder in response to rotation of the shaft 34.

As here shown, the piston 101 is of the solid type and has a flattened conical lower end 103 which will fit snugly into a correspondingly formed lower end 104 of the cylinder 102. This structure permits the parts to be made so that a minimum volume of liquid (sample, reagent or wash water) will remain in cylinder 102 when the piston 101 is in its lowermost position. The minimum volume affords precision of measurement and avoids the possibility of diluting the next pump load with a large quantity of liquid left over from the last cycle.

The piston 101 is formed with an actuating arm 106 extending radially from its upper end through a vertical slot 107 in the wall of cylinder 102. Movement of arm 106 up and down actuates the pump. This movement is provided by a reciprocating member 108 threadably engaged on a shaft 109 journaled for rotation in bearings 111 carried in the transfer head 21.

Member 108 is held against rotation by an arm 112 having a forked end 113 slidably engaging a vertical guide post 114. Thus, rotation of shaft 109 will cause the member 108 to move up or down depending upon the direction of rotation of shaft 109. Arm 106 is slidably engaged in a slot 116 formed in member 108 and, accordingly, up or down movement of member 108 will force the piston up or down in the same manner.

Rotation of shaft 109 is effected by a gear 117 secured thereto and engaged with a gear 118 carried on shaft 34. Gear 118 is journaled on shaft 34 and is operatively connected thereto by a friction clutch which includes an O-ring 119 interposed between the gear 118 and a flanged member 121 secured to shaft 34. A spring 122 is adjustably mounted between the upper face of gear 118 and a pair of nuts 123 threaded on the upper end of shaft 34. The clutch causes the gear 118 to rotate with the shaft 34 until halted by the member 108 reaching its lowermost position when a pin 125 depending from member 108 will engage a pin 124 projecting upwardly from gear 117. The clutch then allows shaft 34 to continue to rotate without affecting the pump until the shaft reverses its direction of rotation.

Each transfer head 21 is equipped with two members 108, etc., see FIGURE 2. The threaded connections are such that one member 108 moves up as the other is moving down and vice versa. This permits accurate determination of the length of stroke and hence the volumetric capacity of the pump on each stroke.

The bearing assembly 111 is held in place in head 21 by a set screw 126. Loosening of this set screw permits the shaft 109 to be moved upwardly until the gear 117 is disengaged from gear 118. Member 108 may then be moved up or down by rotating shaft 109 to adjust the number of turns it takes to complete a stroke of the pump, and to position the piston end 103 precisely in end 104 of the cylinder 102 to leave a minimum volume.

The pump means 23 may be used to suck up a sample at one position of transfer head 21, discharge the sample at the next position, suck up wash water at the third position, and discharge the wash water and go through a complete dry cycle so as to dry out the passages in the fourth position. Other patterns of action may be programmed within the capabilities of the machine, and auxiliary equipment may be used. For example, FIGURE 4 illustrates a siphon device 131 which can function to convey the sample to other modules.

The siphon 131 here consists of a feeler tube 132 ending in probe 29 and adapted to be inserted into a sample tube by movement of the transfer head 21, the tube 132 also being adapted for connection to some other module of the system, such as a photometer or chromatoscope. The tube 132 is secured to a member 133 which is urged downwardly in a barrel 134 by a spring 136. A resilient gasket 137 seats against the rim of sample tube 28, and the spring loading of tube 132 insures that it will contact the bottom of the sample tube without breaking the latter or bending the tube.

The contents of the sample tube 28 are forced into tube 132 by air pressure from pump means 23. A tube 138, which may be of flexible Teflon plastic, has plug-in type quick connectors 139 of stainless steel with neoprene O-rings at either end. These connectors may be plugged into the lower end of pump 23 and into a bore 141 in siphon 131. Then, as the piston moves in the pump, air will be forced into the sample tube to force the contents through conduit 132. Reversing of the pump will draw the sample back into tube 28.

Preferably, the parts of the device are made of corrosion-resistant materials which will not contaminate the samples. To this end all parts which contact the sample or reagents are formed of stainless steel, neoprene or Teflon (this being the best-known name of the plastic also known as polytetrafluoroethylene). The pump is made with Teflon piston and cylinder to take advantage of the self-lubricating as well as the anti-corrosion qualities of the material.

The flexibility of the present system may be seen, in part, in the showing of FIGURE 11 which is a semi-schematic plan view of a typical installation. Here a reel 142 of sample tubes 28 moves in stepwise order past a transfer head 21a which has two pumps 23a mounted thereon. These pumps may be programmed to transfer the samples sequentially to tubes in an incubator bath 143, which also rotates in stepwise increments, and to clean themselves between samples in the manner previously described.

The next transfer head 21b may be provided with a siphon 131 adapted to transfer the sample to a device such as a photometer 144. After a reading is taken, the sample may be returned to the incubator 143 and a third transfer head 21c may be set up to add a reagent. After passage around the incubator, the sample may be transferred a second time by transfer head 21b to photometer 144 for a comparative reading and thereafter returned to reel 142.

It should be understood that the arrangement here described is presented only by way of illustration and to show the high adaptability and flexibility of the present invention, other arrangements lying within the capabilities of the present apparatus.

I claim:

1. A fluid transfer apparatus, comprising a transfer head, drive means for selectively moving said transfer head vertically and rotatably between a plurality of stations, pump means on said transfer head formed for taking in and ejecting a measured quantity of fluid, and control means responsive to operation of said drive means for selectively actuating the taking in and ejecting cycles of said pump means when the transfer head is positioned at preselected of said stations.

2. A fluid transfer apparatus, comprising a transfer head mounted for reciprocation along and rotation around a vertical axis so as to be movable between a plurality of stations, pump means on said transfer head formed for taking in and ejecting a measured quantity of fluid through a conduit having a depending end adapted for extending into different open top containers when said transfer head is at different stations, drive means for operating said pump means and for moving said transfer head between said stations, and control means connected to said drive means and formed for operating the latter sequentially whereby intake and ejecting cycles of said pump means may be selectively actuated at different stations in accordance wtih a predetermined program.

3. A fluid transfer apparatus, comprising a transfer head mounted for reciprocation along and rotation around a vertical axis so as to be movable between a plurality of stations, pump means on said transfer head formed for taking in and ejecting a measured quantity of fluid, drive means for operating said pump means and for moving said transfer head between said stations, said pump means having a piston slidable in a cylinder connected to a conduit having a depending end adapted for extending into different open top containers at different stations of said transfer head, and control means connected to said drive means and formed for operating the latter sequentially whereby intake and ejecting cycles of said pump may be selectively actuated at different stations in accordance with a predetermined program.

4. A fluid transfer apparatus, comprising a transfer head mounted for reciprocation along and rotation around a vertical axis so as to be movable between a plurality of stations, a positive displacement pump formed for taking in and ejecting a measured quantity of fluid, said pump having a conduit with a depending end adapted for extending into different open top containers when said transfer head is at different stations, drive means connected to said transfer head for intermittently rotating the latter between said stations, said drive means being formed to lower said head when at a station so as to lower said depending conduit end into an open top container thereat and to lift said transfer head prior to movement to the next station sufficiently for the depending conduit end to clear the open top containers, and control means connected to said drive means and formed for operating the latter sequentially whereby intake and ejecting cycles of said pump may be selectively actuated at different stations in accordance with a predetermined program.

5. A fluid transfer apparatus, comprising a transfer head mounted for reciprocation along and rotation around a vertical axis so as to be movable between a plurality of stations, a positive displacement pump on said transfer head formed for taking in and ejecting a measured quantity of fluid, said pump having a conduit with a depending end adapted for extending into open top containers when said transfer head is at different stations, drive means connected to said transfer head for intermittently rotating the latter between said stations, said drive means being formed to lower said head when at a station so as to lower said depending conduit end into an open end container thereat and to lift said transfer head prior to the movement to the next station sufficiently for the depending conduit end to clear the open top containers, said pump being formed for selective operative connection to said drive means at said stations whereby the intake and ejecting cycles of the pump may be selectively effected, and a control device connected to said drive means and operable by movements of said transfer head for effecting movement of the transfer head between stations and for actuating selected cycles of said pump at each station in accordance with a preselected program.

6. A fluid handling component for carrying out pipetting and sample tube cleaning operations in an automatic chemical analysis system, comprising a transfer head movable between a plurality of stations, drive means for selectively moving said transfer head from one station to another, pressurized siphon means formed to educt the contents of a sample tube at one of said stations and transfer the same to another analytical component, said siphon means having a conduit with a vertically depending end formed for engagement with the bottom of a sample tube so as to draw substantially the entire contents therefrom, said conduit end being resiliently mounted for vertical displacement relative to said transfer head, and control means for actuating said siphon means when at a desired station.

7. A fluid handling component for carrying out pipetting and sample tube cleaning operations in an automatic chemical analysis system, comprising a transfer head movable between a plurality of stations, drive means for selectively moving said transfer head from one station to another, siphon means formed to educt the contents of a sample tube at one of said stations and transfer the same to another analytical component, said siphon means having a resilient member adapted for seating against the rim of a sample tube so as to provide a hermetic seal therewith, said siphon means having a conduit with a vertically depending end formed for engagement with the bottom of a sample tube so as to draw substantially the entire contents therefrom, pump means connected to said siphon means and formed for forcing air under pressure into the sample tube so as to force the sample into and through said conduit, and control means for actuating said pump means when said siphon means is at a desired station.

8. A fluid handling component as described in claim 7, and wherein said pump means is reversible for drawing the sample back out of said conduit and into the sample tube.

9. A fluid handling component as described in claim 8, and wherein said siphon means is formed to engage a tubular reservoir when at a different station and to draw clean water into said conduit for washing out the same preparatory to handling another sample.

10. A fluid handling component for carrying out pipetting and sample tube cleaning operations in an automatic chemical analysis system, comprising a transfer head movable between a plurality of stations, drive means for selectively moving said transfer head from one station to another, pump means formed to educt a measured quantity of the contents of a tubular container at a desired one of said stations and to eject said measured quantity at a desired one of said stations, said pump means including a piston slidable in a cylinder connected to a conduit having a depending end formed for insertion in said tubular container, and control means for actuating said pump means at the desired stations in accordance with a preselected program.

11. A fluid handling component as described in claim 10, and wherein said piston and cylinder are formed of polytetrafluoroethylene plastic whereby the piston and cylinder will be self-lubricating and immune to corrosive attack by samples and reagents entering the cylinder.

12. In a fluid handling component of the character described, a fluid transfer head, a vertical shaft supporting said transfer head and mounted for vertical and rotating movement for displacing said head between a plurality of stations, pump means formed to educt a measured quantity of the contents of a tubular container at a desired one of said stations and to eject said measured quantity at a desired one of said stations, control means for actuating said pump means at the desired station in accordance with a preselected program, drive means for effecting intermittent rotation of said shaft to move said transfer head between said stations, said drive means including a plurality of upstanding pins secured in equally spaced relation around said shaft for rotative and vertical movement therewith, elevator means for moving said shaft vertically so as to lower and raise said transfer head at said stations, and a drive finger having a horizontal axis movable in a cylindrical plane intercepting said pins when said shaft is in up position whereby said transfer head will be intermittently rotated from one station to another only when said head is elevated high enough for the pump means to clear the tubular containers.

13. In a fluid handling component of the character described, a fluid transfer head, a vertical shaft supporting said transfer head and mounted for vertical and rotating movement for displacing said head between a plurality of stations, pump means formed to educt a measured quantity of the contents of a tubular container at a desired one of said stations and to eject said measured quantity at a desired one of said stations, control means for actuating said pump means at the desired stations in accordance with a preselected program, drive means for effecting intermittent rotation of said shaft to move said transfer head between said stations, elevator means for moving said shaft vertically so as to lower and raise said transfer head at said stations, said elevator means including a collar having spaced flanges on said shaft, a roller riding between said flanges, a drive element rotatable around a horizontal axis intersecting the axis of said shaft, an arm pivoted on said drive element in spaced relation to said horizontal axis and carrying said roller at its distal end, and gearing on said drive element and arm formed to rotate said arm at the same rate of rotation as said drive element whereby said roller will move vertically up and down between said flanges so as to move said transfer head therewith.

14. A fluid handling component for carrying out pipetting and sample tube cleaning operations in an automatic chemical analysis system, comprising a transfer head movable between a plurality of stations, drive means for selectively moving said transfer head from one station to another, pump means formed to educt a measured quantity of the contents of a tubular container at a desired one of said stations and to eject said measured quantity at a desired one of said stations, sample tube conveying means formed to transport sample tubes to locations positioned for operative connection to said pump means in sequential order whereby consecutive samples may be identically processed, and programming means for operating said drive means and said pump means and said tube conveying means in a desired programmed sequence.

15. In a fluid handling component of the character described, a fluid transfer head, a vertical shaft supporting said transfer head and mounted for vertical and rotating movement for displacing said head between a plurality of stations, a positive displacement pump having a depending probe and formed to educt a measured quantity of the contents of a tubular container through said probe at a desired one of said stations and to eject said measured quantity through said probe at a desired one of said stations, control means for actuating said pump at the desired stations in accordance with a preselected program, drive means for effecting intermittent rotation of said shaft to move said transfer head between said stations, and elevator means for moving said shaft vertically so as to lower and raise said transfer head at said stations.

References Cited in the file of this patent

UNITED STATES PATENTS

| | | |
|---|---|---|
| 1,742,871 | North | Jan. 7, 1930 |
| 2,624,656 | Andrews et al. | Jan. 6, 1953 |
| 2,879,141 | Skeggs | Mar. 24, 1959 |

FOREIGN PATENTS

| | | |
|---|---|---|
| 1,237,774 | France | June 27, 1960 |

Dedication 3,178,266.—*Erik W. Anthon*, Kensington, Calif., MATERIALS HANDLING APPARATUS. Patent dated Apr. 13, 1965. Dedication filed Mar. 2, 1970, by the assignee, *American Optical Corporation.*
Hereby dedicates the remaining term of the patent to the Public.
[*Official Gazette August 18, 1970.*]